Feb. 2, 1943. J. E. HALL 2,309,897
PUMP
Filed Aug. 5, 1939 2 Sheets-Sheet 1

INVENTOR.
Jesse E. Hall.
BY
ATTORNEY.

Feb. 2, 1943.  J. E. HALL  2,309,897
PUMP
Filed Aug. 5, 1939   2 Sheets-Sheet 2
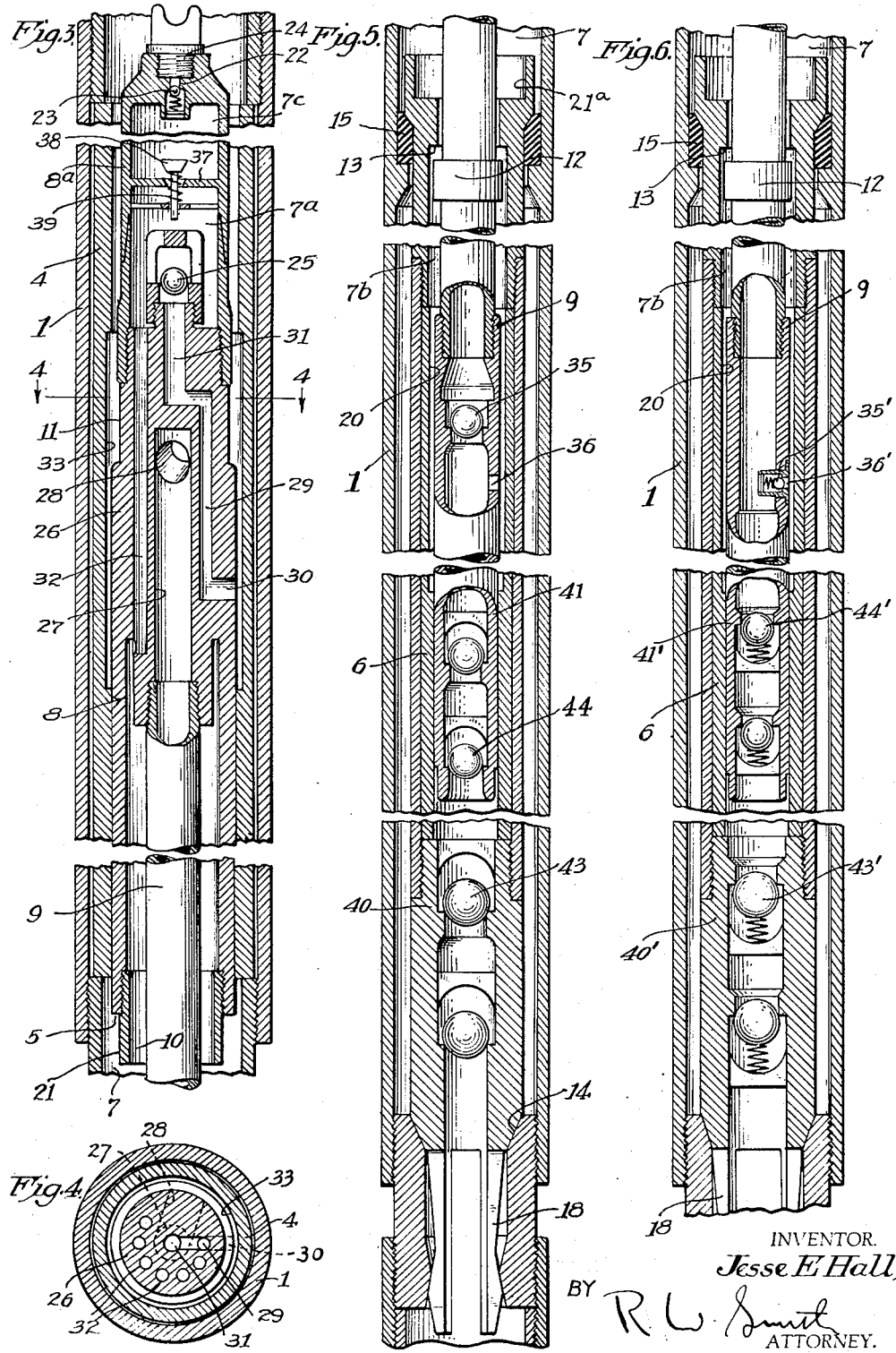
INVENTOR.
Jesse E Hall,
BY R. W. Smith
ATTORNEY.

Patented Feb. 2, 1943

2,309,897

UNITED STATES PATENT OFFICE 2,309,897

PUMP

Jesse E. Hall, Los Angeles, Calif., assignor, by direct and mesne assignments, to Pacific Pump Works, Huntington Park, Calif., a corporation of California Application August 5, 1939, Serial No. 288,629

6 Claims. (Cl. 103—46)

This invention is a pump, the present invention being a continuation in part of my copending application Ser. No. 242,750, filed November 28, 1938.

It is an object of the invention to operate an actuator by fluid pressure, with the same conduit which supplies the pressure fluid providing for passage of this fluid to or from a pump which is operated by the actuator.

It is a further object of the invention to shift an actuator and a pump in one direction by fluid pressure, with said shifting of the actuator storing energy which upon relief of the fluid pressure shifts the actuator and the pump in the opposite direction.

It is a still further object of the invention to alternately exert and relieve fluid pressure upon the actuator for cyclic operation.

It is a still further object of the invention to exert fluid pressure at differential area of the actuator, for shifting the actuator in one direction against resistance at its minor-area working face, with said shifting of the actuator storing energy which upon relief of the fluid pressure exerts pressure at the differential area for shifting the actuator and the pump in the opposite direction.

It is a still further object of the invention to regulate exertion of fluid pressure and its alternate relief, so that when exerted at the differential area of the actuator the fluid pressure shifts the actuator in one direction against resistance at its minor-area working face, and stores such energy that upon relief of the fluid pressure the stored energy which is then exerted at the differential area shifts the actuator and the pump in the opposite direction against resistance determined by the particular type of pump, and which resistance may be exerted throughout the minor-area working face of the actuator.

It is a still further object of the invention to adapt the pump for coordination of its working stroke with either shifting of the actuator and the pump responsive to fluid pressure or with reverse shifting of the actuator and the pump responsive to stored energy.

More particularly it is an object of the invention to contract a compression chamber and thereby compress an elastic fluid responsive to shifting of the actuator in one direction by pressure of a substantially non-compressible fluid, and upon relief of pressure of the substantially non-compressible fluid to shift the actuator in the opposite direction and thereby expand the compression chamber responsive to pressure of the compressed elastic fluid.

It is a still further object of the invention to seal the compression chamber to the substantially non-compressible fluid throughout the major portion of contraction and expansion of said chamber; but at terminal contraction of the compression chamber to preferably open it to the substantially non-compressible fluid in the event the pressure of said fluid exceeds that in the compression chamber, and at terminal expansion of the compression chamber to preferably discharge therefrom into the substantially non-compressible fluid in the event the pressure in the compression chamber exceeds that of the substantially non-compressible fluid.

The invention is particularly applicable to pumping fluid through a conduit, with the actuator installed in the conduit adjacent the pump for direct connection therewith, and operated by alternately exerting and relieving pressure upon the fluid at a point remote from the pump. Fluid may thus be pumped via the conduit and the fluid in this same conduit provides means for transmitting energy for operating the pump from a source of power which may be at a point along the conduit remote from the actuator and the pump.

The invention is thus particularly applicable to well pumps. The pump and its actuator may be installed at any desired level in a well for pumping fluid via a usual well string, and at the earth's surface pressure may be alternately exerted and relieved on this fluid in the well string for operating the actuator and the pump.

Further objects of the invention will be readily understood from the following description of the accompanying drawings which illustrate various forms which the invention may assume in practice, it being understood that the forms which are shown and described are for purpose of illustration, and that the invention may be modified and is entitled to various forms without departing from the scope of the appended claims.

In the drawings:

Fig. 3 is a detail vertical section through the upper portion of the actuator.

Fig. 4 is a transverse section on the line 4—4 of Fig. 3.

Fig. 5 is a detail vertical section through the lower portion of the pump and apparatus which is operated thereby.

Fig. 6 is a fragmentary view similar to Fig. 5, showing a modification of the pump which is operated by the actuator.

Figure 1:
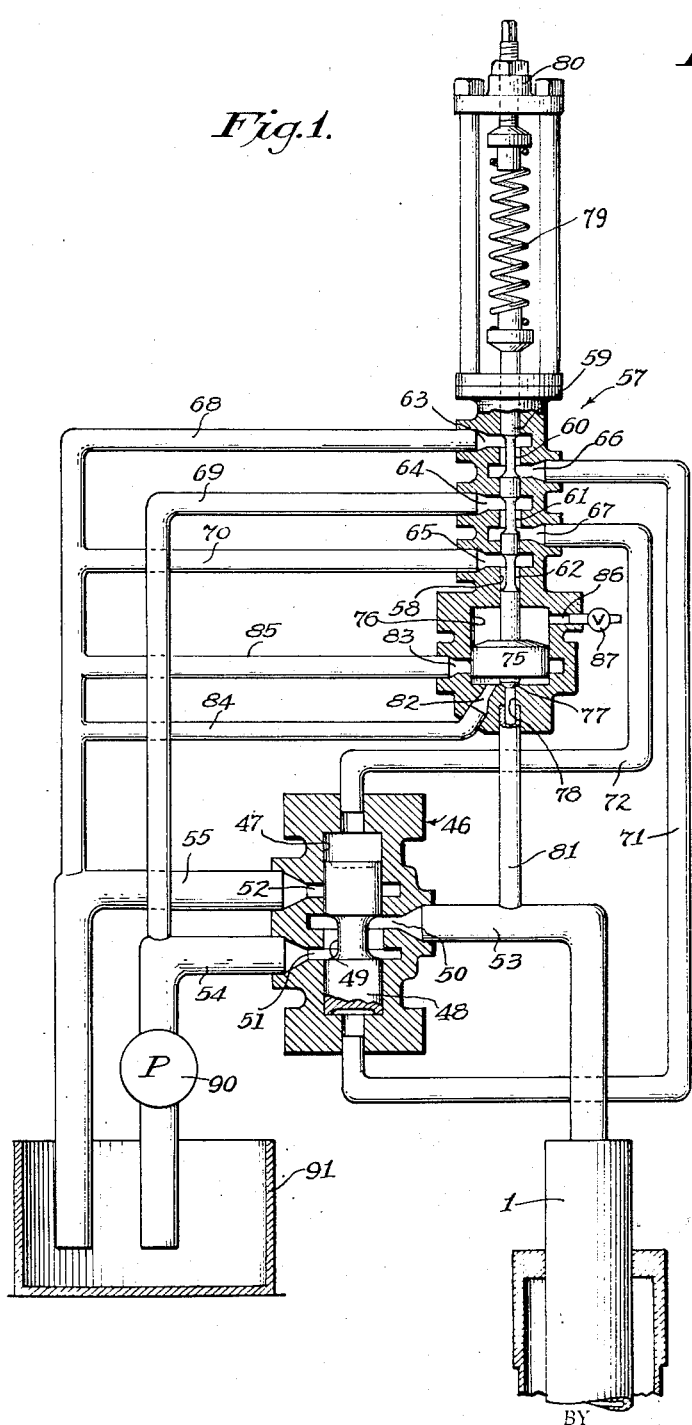
Fig. 1 is a vertical section through control mechanism for the actuator, showing the upper end of a well string in which the actuator and pump are installed.
Figure 2:
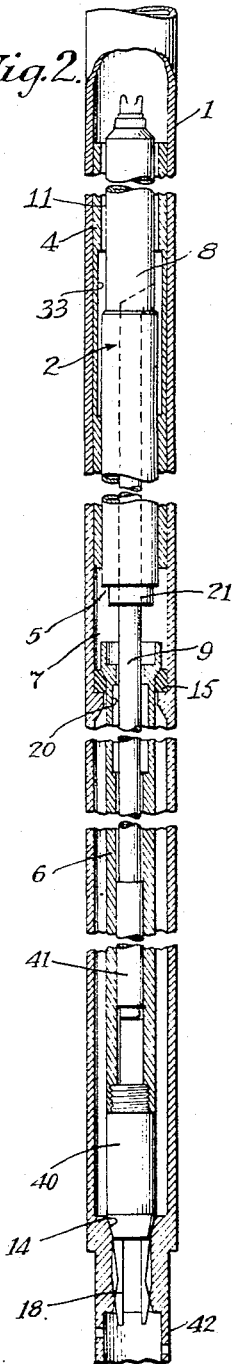
Fig. 2 is a vertical section through the lower end of the well string, showing the pump and apparatus which is operated thereby.

The invention is particularly applicable to an oil well pump, which together with its actuator are installed at any desired level in a well, with means at the earth's surface for alternately exerting and relieving pressure upon the column of fluid which is being pumped, and with this alternate exertion and relief of fluid pressure operating the actuator and the pump which is connected thereto. The actuator or fluid motor for the pump is described and claimed in my copending application Ser. No. 335,291, filed May 15, 1940; the present invention being a pump actuated by such a fluid motor.

As an instance, a usual well string 1 extends from the earth's surface into a well bore; and an actuator 2 is installed in the well string at any desired level, preferably immediately above the pump which is to be operated by the actuator. The actuator is operated by alternately exerting and relieving pressure upon a column of fluid in the well string, there being means at the earth's surface for controlling this alternate exertion and relief of pressure; and in addition to thus transmitting energy for operating the actuator, the column of fluid in the well string may be fluid which is adapted for flow to or from the pump which is to be operated by the actuator.

For example, the single well string 1 carries the column of fluid which is being pumped, and this same column of fluid transmits energy for operating the actuator.

The actuator is shifted in one direction by pressure exerted upon the column of fluid in the well string 1, with this shifting of the actuator storing energy which upon relief of pressure upon the column of fluid shifts the actuator in the opposite direction. The stored energy is preferably pressure of an elastic fluid, which is compressed by shifting the actuator responsive to pressure of the column of fluid.

As an instance of this arrangement, the upper end of the actuator is adapted for sealed sliding fit in the bore of a liner 4 which is fixed in the well string 1 at any desired level, and the lower end of the actuator is of reduced diameter so that the actuator forms a shoulder 5 between its upper and lower ends, and the lower end of the actuator is adapted for sealed sliding fit in the bore of a liner 6 which is fixed in the well string in spaced relation below the liner 4. The annular space 7 which surrounds the depending end of the actuator between the shoulder 5 and the upper end of the liner 6 thus forms a chamber which is sealed at its ends by sliding fit of the ends of the actuator in the bores of the liners 4—6 and which is longitudinally contracted when the actuator is shifted downwardly, thereby compressing fluid in the chamber 7.

To increase the capacity of the compression chamber 7, the actuator preferably comprises a sleeve 8 and a concentric depending element 9 which is of smaller diameter than the sleeve; and the sleeve is closed at its upper end but is open at its lower end to the compression chamber 7 via an annular space 10 which is formed between the element 9 and a surrounding collar 21 which depends from the lower end of the sleeve 8 at the shoulder 5. The interior of the sleeve 8 thus forms a continuation 7a of the compression chamber 7.

The depending element 9 is connected to the pump which is to be operated by the actuator, and fluid in the well string above the liner 4 may flow to or from the pump via a bore which extends through the element 9, with the upper end of the bore opening through the wall of the sleeve 8 at the upper portion of said sleeve which is of reduced diameter as shown at 11.

The actuator 2 and the pump which is suspended from the element 9 are adapted for limited reciprocation in the well string 1. Downward displacement of the actuator is limited by engagement of the shoulder 5 with the upper end of the liner 6, and upward displacement of the actuator is limited by engagement of a collar 12 on the element 9 with an annular shoulder 13 which is formed in a radially enlarged upper end 20 of the bore of the liner 6.

The liner 6 is lowered into and withdrawn from the well string along with the actuator 2, the liner being suspended from the element 9 by engagement of its shoulder 13 with the collar 12; and when the liner is in place it may seat on a shoulder 14 of the well string with packing 15 preferably mounted between the upper end of the liner and the surrounding well string, and with the element 9 then adapted for reciprocation in the liner between the limits of reciprocation as determined by the engagements 5—6 and 12—13. The liner 6 may be anchored on the shoulder 14, preferably by usual anchoring means 18 which when the liner has seated on the shoulder is automatically engaged, but which is adapted to yield responsive to a strong pull exerted on the actuator 2, for withdrawing the liner along with the actuator.

When the actuator 2 and the liner 6 have been operatively positioned in the well string, that portion of the well string which is above the liner 4, and the annular space surrounding the diametrically reduced upper portion 11 of the sleeve 8, are filled with a substantially non-compressible fluid, with said fluid adapted for flow via the bore of the element 9 to or from the pump which is suspended therefrom and which is to be operated by the actuator; and the annular space 7 together with the lower portion of the space 7a preferably also contains this substantially non-compressible fluid, while the upper portion of the space 7a contains an elastic fluid.

By a control at the earth's surface, pressure is then exerted on the column of substantially non-compressible fluid in the well string, with the sealed sliding fit of the sleeve 8 in the liner 6 preventing escape of this pressure past the actuator, and with means (hereinafter described) which is provided in the bore of the element 9 preventing escape of this pressure via said bore. The actuator 2 is thus shifted downwardly, thereby longitudinally contracting the compression chamber 7—7a and thus compressing the elastic fluid in the upper portion of the space 7a. The pressure on the column of fluid in the well string is then relieved, whereby pressure of the elastic fluid which has been compressed in the upper portion of the space 7a elevates the actuator, thereby longitudinally expanding the compression chamber 7—7a. The cycle of operation is then repeated, and this reciprocation of the actuator operates the pump which is connected to its depending element 9.

Means are preferably provided for so compressing the elastic fluid during downstroke of the actuator, as to cushion and terminate the downstroke short of engagement of the shoulder 5 with the upper end of the liner 6, with said compression of the elastic fluid providing pressure which is adequate to then elevate the actuator against whatever load resistance may be encountered. For this purpose, as the actuator approaches its limit of downward travel the pressure in the compression chamber 7—7a is automatically equalized with whatever pressure has been exerted on the substantially non-compressible fluid for downwardly shifting the actuator. This equalization of pressure is preferably obtained by providing a passageway which is sealed throughout major portion of reciprocation of the actuator, but which opens the upper portion of the well string 1 to the compression chamber 7—7a as the actuator approaches its limit of downward travel.

As an instance of this arrangement, the sleeve 8 includes a section 26 at the lower end of its diametrically reduced portion 11, with this section axially bored as shown at 27. The bore 27 terminates short of the upper end of the section 26, and the element 9 depends from and communicates with the lower end of said bore. At its upper end, the bore 27 opens laterally through the wall of the sleeve 8 at the lower end of its diametrically reduced upper portion 11 as shown at 28.

The section 26 also has a series of longitudinal bores spaced circumferentially around the bore 27, with the bore 28 extending laterally between two of these circumferentially spaced bores as shown at Fig. 4. One of these longitudinal bores, shown at 29, communicates at its lower end with a port 30 which opens laterally through the peripheral wall of the sleeve 8 in spaced relation below its diametrically reduced upper portion 11; and the upper end of the bore 29 terminates short of the upper end of the section 26 and communicates laterally with an axial bore 31 which opens through the upper end of said section. A check valve 25 at the upper end of the bore 31 opens for flow from said bore into that portion of the space 7a which is above the section 26, while closing against reverse flow from said space into said bore. The remainder of the longitudinal bores which are circumferentially spaced around the bore 27 and which are shown at 32, communicates at their respective ends with the portions of the space 7a which are respectively above and below the section 26.

The liner 4 has a radially enlarged bore intermediate of its ends as shown at 33, so that throughout major portion of reciprocation of the actuator 2 the port 30 is closed by the wall of the bore of the liner 4, but as the actuator approaches terminal downward travel the port 30 alines with the enlarged bore 33 as shown at Fig. 3, thereby opening the port 30 to the annular space surrounding the diametrically reduced upper portion 11 of the sleeve 8. The substantially non-compressible fluid which is in the upper portion of the well string, thus flows via said annular space and the open port 30 and the bores 29—31, past the check valve 25 and into the upper portion of the space 7a, and thence via the bores 32 and into the lower portion of the compression chamber 7—7a, until the pressure of the elastic fluid which has been compressed in the upper portion of the compression chamber 7—7a equals that of the non-compressible fluid in the upper portion of the well string.

Any desired pressure may thus be exerted upon the column of substantially non-compressible fluid in the upper portion of the well string for insuring downward travel of the actuator; and any desired pressure may be built up in the compression chamber 7—7a by exerting desired pressure upon the column of substantially non-compressible fluid, so that upon relief of pressure of said column of fluid, the pressure of the compressed elastic fluid in the upper portion of the space 7a will upwardly shift the actuator 2 against any load resistance which may be encountered. During relief of pressure of the column of substantially non-compressible fluid in the upper portion of the well string, the check valve 25 closes against escape of pressure from the compression chamber 7—7a.

Additional means are preferably provided for cushioning downstroke of the actuator in the event of such abnormal downward travel as to engage the shoulder 5 with the upper end of the liner 6. For this purpose, during normal downward travel of the actuator for longitudinally contracting the compression chamber 7—7a, the collar 21 which depends from the lower end of the sleeve 8 remains clear of the upper end of the liner 6, and the non-compressible fluid in the space 7 is thus free to flow via the annular space 10 into the space 7a for compressing the elastic fluid in the upper portion of the space 7a. But in the event of abnormal downward travel of the actuator, the collar 21 snugly telescopes within an enlarged bore 21a at the upper end of the liner 6, thereby restricting flow via the annular space 10 and thus trapping substantially non-compressible fluid in the space 7 so as to cushion abutment of the shoulder 5 against the upper end of the liner 6.

Means are preferably provided for cushioning and terminating upstroke of the actuator short of engagement of its collar 12 with the shoulder 13. For this purpose, when the pressure of the column of substantially non-compressible fluid in the well string has been relieved and as the actuator approaches its limit of upward travel responsive to pressure of the elastic fluid which has been compressed in the upper portion of the space 7a, pressure of this elastic fluid is automatically equalized with that of the relieved pressure of the column of fluid in the well string. Thus equalization of pressure is preferably obtained by providing a passageway which is sealed throughout major portion of reciprocation of the actuator, but which opens the compression chamber 7—7a to the upper portion of the well string 1 as the actuator approaches its limit of upward travel.

As an instance of this arrangement, a port 36 opens laterally from the bore of the element 9 and through the peripheral wall of said element, and the enlarged bore 20 of the liner 6 extends downwardly from the upper end of the liner to a level whereby throughout major portion of reciprocation of the actuator 2 the port 36 is closed by the wall of the bore of the lower portion of the liner 6, but as the actuator approaches terminal upward travel the port 36 alines with the enlarged bore 20 as shown at Fig. 5, thereby opening the port 36 to this enlarged bore.

The enlarged bore 20 forms a continuation 7b of the compression chamber 7—7a; and when the port 36 is opened, the substantially non-compressible fluid which is in the lower portion of the compression chamber thus flows via said open port into the bore of the element 9 which communicates with the bore of the well string 1, until the pressure of the elastic fluid which has been compressed in the upper portion of the space 7a is reduced to the relieved pressure of the column of fluid in the well string. During subsequent exertion of pressure upon the column of substantially non-compressible fluid in the well string and in the bore of the element 9, for again downwardly shifting the actuator, a check valve closes to prevent escape of pressure of this substantially non-compressible fluid from the bore of the element 9 via the port 36.

This check valve may be mounted in the bore of the element 9 above the port 36, as shown at 35 in that embodiment of the invention which is illustrated at Fig. 5 and wherein the pump which is operated by the actuator 2 is a pump for elevating fluid via the bore of the element 9 and thence via the well string to the earth's surface, the check valve being adapted to open responsive to fluid pressure exerted upwardly through the bore of the element 9, and to close responsive to gravity and fluid pressure exerted downwardly via said bore.

In the modification of the invention illustrated at Fig. 6, the check valve is mounted in the lateral port which is formed in the peripheral wall of the element 9, this lateral port being shown at 36′ and the check valve being shown at 35′. This construction is employed where the pump which is to be operated by the actuator 2 is a pump adapted for flow of fluid downwardly through the well string and thence downwardly via the bore of the element 9, the check valve 36′ permitting free flow via the bore of the element 9, and being adapted to open against tension of a cooperating spring and responsive to fluid pressure in the annular space 7b, and to close responsive to tension of its spring and fluid pressure in the bore of the element 9.

Prior to installing the actuator and the pump in a well string, elastic fluid may be precharged to any desired pressure in the upper portion of the compression chamber 7—7a—7b. For this purpose, the upper end of the sleeve 8 comprises a chamber 8a which is detachably connected to the main portion of the sleeve, and the lower end of the chamber 8a is closed by a partition 37, with a valve 38 in said partition normally opened by a spring 39 but adapted to close against escape of pressure from the space 7c which is formed by the chamber 8a. Prior to mounting the chamber 8a on the sleeve 8, the valve 38 is manually closed against the tension of its spring and elastic fluid is compressed in the space 7c, with the pressure of the compressed fluid maintaining the valve 38 in closed position. The elastic fluid may be supplied at desired pressure from any suitable source, via a supply duct 22 in the chamber 8a, which may be provided with a check valve 23 and which after the desired pressure has been attained in the space 7c may be closed by an element 24 which provides means whereby the actuator may be suspended from any suitable means (not shown) for lowering the actuator into and withdrawing it from the well string 1.

The chamber 8a is then assembled on the sleeve 8 and the actuator and the pump are lowered into the well string 1 which is filled with a column of substantially non-compressible fluid. As the actuator is lowered through this column of fluid, the hydrostatic head of the fluid column compresses the air which is trapped in the upper portion of the space 7a, and the precharge pressure in the space 7c is such that by the time the actuator reaches its operative position in the well string, the pressure in the upper portion of the space 7a, plus tension of the spring 39, opens the valve 38 and thus provides equalized precharge pressure in the upper portion of the space 7a and in the space 7c, with the spring 39 then retaining the valve 38 in open position throughout the cycle of operation and irrespective of surge of pressure past the open valve, so that the space 7c forms a continuation of the compression chamber 7—7a—7b, with the pressure thus uniform through this entire compression chamber.

The precharge pressure which is thus established throughout the entire compression chamber is preferably such that when the liner 6 has been seated on the shoulder 14 and the actuator is ready for reciprocation by alternately exerting and relieving pressure on the fluid column in the well string 1, the actuator and the plunger of the pump are approximately balanced between the hydrostatic head of the column of fluid which tends to lower the actuator and pressure of the elastic fluid in the space 7a—7c which tends to elevate the actuator.

In order to adapt the pump for operation by the actuator, the lower end of the liner 6 may form a usual pump barrel 40 and the lower end of the element 9 may form a usual pump plunger 41 which is adapted for reciprocation in the barrel 40, with that portion of the well string 1 which extends below the pump comprising usual perforated pipe 42. The pump may force fluid into the well bore via the perforated pipe 42 or may withdraw fluid from the well bore via said perforated pipe, i. e. the column of substantially non-compressible fluid in the well string 1 may be circulation fluid which is supplied to the upper end of the well string 1 and which it is desired to pump via the bore of the element 9 and thence via the perforated pipe 41 into the surrounding well bore, or it may be production fluid from the well which is adapted for intake via the perforated pipe 42 and which is then pumped via the bore of the element 9 and the well string 1 for elevation to the earth's surface.

As shown at Fig. 5, the pump is adapted for pumping fluid from the well, e. g., production fluid such as oil, with which some quantity of gaseous constituents may be entrained. For this purpose, usual standing valves 43 are provided in the pump barrel 40 below the reciprocating plunger 41, and usual working valves 44 are provided in the hollow bore of the plunger 41 which communicates with the hollow bore of the element 9. The valves 43—44 are adapted to open responsive to fluid pressure exerted upwardly via the bore of the pump, and to close responsive to gravity and fluid pressure exerted downwardly via the bore of the pump. When the pump plunger is reciprocated by the actuator 2, the pump is thus adapted for usual operation for elevating production fluid from the well via the bore of the element 9 and thence via the well string 1 to the earth's surface, with the check valve 35 functioning as one of the working valves of the pump.

At the modification which is shown at Fig. 6, the pump is adapted for pumping fluid into the well, e. g., a liquid medium such as usually employed for circulation in a well. For this purpose, the standing valves 43' in the pump barrel 40' and the working valves 44' in the plunger 41' of the pump are adapted to open against tension of cooperating springs and responsive to fluid pressure exerted downwardly via the bore of the pump, and to close responsive to tension of their springs and fluid pressure exerted upwardly via the bore of the pump. When the pump plunger is reciprocated by the actuator 2, the pump is thus adapted for usual operation, i. e., flow of circulation fluid downwardly through the well string 1 from the earth's surface and thence through the bore of the element 9, from whence it is pumped into the surrounding well bore.

At the earth's surface pressure is alternately exerted and relieved upon the column of substantially non-compressible fluid in the well string, i. e., the column of production liquid which is being pumped from the well (Fig. 5) or the column of circulation liquid which is being pumped into the well (Fig. 6). When pressure is thus exerted upon the column of fluid it depresses the actuator 2 and the pump plunger 41; and relief of this pressure permits elevation of the actuator and the pump plunger by pressure of the elastic fluid in the chamber 7a—7c, this elastic fluid being preferably initially precharged to desired pressure as previously described, and during downward movement of the actuator 2 being further compressed by contraction of the compression chamber 7—7a—7b—7c.

The pressure which is exerted via the substantially non-compressible column of fluid for downward stroke of the actuator, is exerted downwardly against the upper end of the sleeve 8 (the diameter of which is defined by the liner 4), but the bore of the element 9 (the diameter of which is defined by the liner 6) opens through the actuator; and therefore the effective area against which pressure is exerted, is the area defined by the diameter of the liner 4, less the area defined by the liner 6, i. e., the effective area is the differential area which is the difference between the areas defined by the diameters of the liners 4—6. Upon relief of pressure exerted via the column of fluid in the well string, the compressed elastic fluid in the chamber 7a—7c exerts pressure for upward stroke of the actuator. This pressure is exerted upwardly against the sleeve 8, but here again, due to the bore of the element 9 opening through the actuator, the effective area against which this pressure is exerted is the differential area which is the difference between the areas defined by the diameters of the liners 4—6. The pressure exerted via the column of fluid in the well string and its subsequent relief is such, that the pressure exerted by the column of substantially non-compressible fluid at said effective area, i. e. at said differential area will depress the actuator for compressing the elastic fluid in the chamber 7a—7c to a pressure whereby upon relief of pressure of the column of substantially non-compressible fluid, the pressure of the elastic fluid exerted at said effective area, i. e. at said differential area will elevate the actuator and the pump plunger against hydrostatic head of the column of fluid in the well string.

Means are provided at the earth's surface for alternately exerting and relieving pressure upon the column of fluid in the well string. While pressure is being exerted, additional fluid is supplied to the column in accordance with that increased capacity of the string which results from downward displacement of the actuator; and during relief of pressure, fluid is discharged at the earth's surface in accordance with that reduced capacity of the string which results from upward displacement of the actuator.

For this purpose, a valve 46 at the earth's surface comprises a cylinder 47 in which a piston 48 is adapted for reciprocation, with the piston annularly recessed intermediate of its ends as shown at 49. A port 50 opens through the wall of the cylinder 47 for communication with the recess 49 throughout reciprocation of the piston, and ports 51—52 open through the wall of the cylinder for respective communication with the recess 49 at opposite limits of travel of the piston. A conduit 53 connects the port 50 and the well string 1; and conduits 54—55 respectively connect the ports 51—52 with a source of fluid under pressure and with storage for said fluid, the fluid being the substantially non-compressible fluid which fills the well string 1 and which is adapted for flow to or from the pump which is to be operated by the actuator 2.

When the piston 48 is at its limit of travel as shown at Fig. 1, fluid under pressure is supplied to the well string via conduit 54, communicating ports 51—50 and conduit 53, for depressing the actuator 2 and maintaining the well string filled to capacity during said displacement of the actuator. When predetermined pressure has been attained in the well string the piston 48 is shifted to its opposite limit of travel, thereby relieving pressure in the well string via conduit 53, communicating ports 50—52 and conduit 55. The actuator 2 is thus elevated by pressure of the compressed elastic fluid in the space 7a—7c, with fluid from the well string in excess of that reduced capacity of the string which results from upward displacement of the actuator, also discharging via conduit 53, communicating ports 50—52 and conduit 55.

The piston of the valve 46 may be positively shifted to its respective limits of travel, by fluid pressure which is alternately exerted against the respective ends of the piston, with corresponding relief of pressure at the opposite end of the piston; and the pressure for reciprocating the piston may be pressure of the fluid which is supplied via the conduit 54. For this purpose, a pilot valve 57 may control fluid pressure, and may comprise a bore 58 in which a plug 59 is adapted for reciprocation, with the plug annularly recessed as shown at 60—61—62. Ports 63—64—65 open through the wall of the bore 58 for respective communication with the recesses 60—61—62 throughout reciprocation of the plug 59, and ports 66—67 open through the wall of the bore 58 for respective communication with the recess 61 at opposite limits of travel of the plug 59. The port 66 is respectively closed and open to the recess 60 while said port is respectively open and closed to the recess 61, and the port 67 is respectively closed and open to the recess 62 while said port is respectively open and closed to the recess 61.

Conduits 68—69—70 are connected to the respective ports 63—64—65, and conduits 71—72 connect the ports 66—67 to respective ends of the valve 46. The conduit 69 is connected to the conduit 54, and the conduits 68—70 are connected to the conduit 55.

When the plug 59 is at its limit of travel as shown at Fig. 1, pressure is exerted via conduits 54—69, communicating ports 64—67 and conduit 72, for shifting the piston of the valve 46 to the position shown at Fig. 1, with pressure at the opposite end of the piston relieved via the conduit 71, communicating ports 66—63 and conduits 68—55. Pressure is thus supplied via the valve 46 for building up pressure in the well string 1. When predetermined pressure is attained in the well string, the plug 59 is shifted to its opposite limit of travel. Pressure is thus relieved via conduit 72, communicating ports 67—65 and conduits 70—55, and is exerted via conduits 54—69, communicating ports 64—66 and conduit 71 for shifting the piston of the valves 46 to its opposite limit of travel. Pressure in the well string is thus relieved via the valve 46. Upon relief of pressure in the well string, the plug 59 is again shifted to the position shown at Fig. 1, for repeating the cycle of operation.

Means are preferably provided for automatically controlling reciprocation of the piston of the valve 46, for building up pressure of the column of fluid in the well string 1 until predetermined pressure is attained, then relieving said pressure, and then repeating the cycle of operation. In the illustrated embodiment, this automatic control is obtained by automatically controlling reciprocation of the plug 59 of the pilot valve 57. As an instance, the plug 59 remains in the position shown at Fig. 1, for building up pressure in the well string via the valve 46, until said pressure overcomes predetermined resistance. Said pressure then shifts the plug 59 to its opposite limit of travel for relieving pressure in the well string via the valve 46, with the plug 59 then remaining in said last mentioned position until predetermined relief of pressure in the well string, whereupon the plug 59 is returned to its position shown at Fig. 1, for repeating the cycle of operation.

For this purpose, a piston 75 is fixed to the valve plug 59 and is adapted for reciprocation in a cylinder 76 of the pilot valve 57; and a valve 77 is fixed to the piston 75 and cooperates with a port 78 which is of appreciably smaller diameter than that of the piston 75. A spring 79, the tension of which may be adjusted at 80, resists shifting of the piston 75 and the plug 59 from the position shown at Fig. 1 and in which position the valve 77 closes the port 78; and a conduit 81 connects the port 78 and the conduit 53 which communicates with the well string 1. A relief port 82 may communicate with that end of the cylinder 76 which has the port 78. A relief port 83 may be closed by the piston 75 when it is in its position shown at Fig. 1; and when the piston is at its opposite limit of travel the port 83 is open to that end of the cylinder 76 which has the port 78. Conduits 84—85 may lead from the ports 82—83 to the conduit 55. A port 86, controlled by a needle valve 87, may open to the atmosphere at that end of the cylinder 76 which is remote from the port 78.

With the piston 75 and the plug 59 in the position shown at Fig. 1, the valve 77 closes the port 78. At this time the valve 46 is in position supplying fluid under pressure to the well string 1 for building up pressure in the well string. The spring 79 will have been adjusted to yield upon predetermined pressure in the well string, exerted via conduit 81 against the restricted area of the valve 77. Yielding of the spring unseats the valve 77, whereupon the predetermined pressure in the well string is exerted against the relatively large area of the piston 75 for shifting the piston and the plug 59 to their opposite limit of travel, thereby operating the valve 46 for reducing pressure in the well string 1. After relief of pressure has been inaugurated, the piston 75 and the plug 59 remain in their last mentioned shifted position until pressure in the well string is so reduced that pressure via conduit 81 against the relatively large area of the piston 75 is overcome by the tension of the spring 79. The piston 75 and the plug 59 are then returned by the spring 79 to the position shown at Fig. 1, thereby operating the valve 46 for again supplying fluid pressure to the well string for repeating the cycle of operation.

Any suitable means, indicated as a pump 90, may be employed for supplying fluid under pressure to the conduit 54, the outlet of the pump being connected to the conduit 54 and the intake to the pump communicating with storage means 91 into which the conduit 55 discharges. Fluid is thus pumped from storage 91 into the well string for exerting any desired pressure therein, and is alternately discharged from the well string to said storage for relieving pressure in the well string, with this alternate exertion and relief of fluid pressure reciprocating the actuator 2, and with the fluid in the well string flowing via the bore of the element 9 to or from the pump which is operated by the actuator 2.

The invention thus provides for transmitting energy for operating an actuator, and for flow to or from a pump which is operated by the actuator, via the same conduit; and also provides for transmitting the energy and supplying or discharging the fluid from a point along the conduit which is remote from the actuator. The invention also provides for transmitting energy for shifting the actuator in one direction, with said shifting of the actuator storing energy for then shifting the actuator in the opposite direction, and with said shifting of the actuator in either direction forming its working stroke.

The actuator and the pump are shifted in the same direction at the same time.

Thus, when the pump is a lift pump (Fig. 5), the pressure exerted via the column of fluid in the well string shifts the actuator and the pump plunger downwardly for filling stroke of the pump. Upon relief of pressure of the column of fluid the compressed elastic fluid in the compression chamber shifts the actuator and the pump plunger upwardly for discharge stroke of the pump. Therefore, throughout the entire length of the column of fluid, from the pump plunger to the earth's surface, relief of pressure via the control at the earth's surface is in the direction of elevation of fluid by the pump, thereby aiding in the pumping operation.

Furthermore, when the pump is a lift pump for an oil well, the column of fluid in the well string will be a column of oil which is substantially non-compressible for exerting desired pressure on the actuator during the filling stroke of the pump, but which will have some slight inherent elasticity due to the presence of gaseous constituents. Therefore, there will be some slight compression of the column of oil (during the filling stroke of the pump), and upon relief of pressure on the column of oil (for discharge stroke of the pump) there will be some expansion of the column of oil; and throughout the entire length of the column of oil, from the pump plunger to the earth's surface, this expansion will be in the direction of relief of pressure at the earth's surface, i. e., it will be in the direction of elevation of oil by the pump and will thus aid in the pumping operation.

When the pump is a force pump (Fig. 6) for forcing circulation fluid into a well, the pressure exerted on the column of fluid in the well string for downward stroke of the actuator and the pump plunger, i. e., the working stroke of the pump, is exerted in the direction of said working stroke, throughout the entire length of the column of fluid, from the earth's surface to the pump plunger, thereby aiding the pumping operation. In similar manner, during relief of pressure in the well string (for upward stroke of the pump), relief of pressure is in the direction of said upward stroke, throughout the entire length of the well string, from the pump plunger to the earth's surface, thereby aiding in said upward stroke of the pump plunger.

I claim:

1. In an oil well pump, a well string, a pair of liners longitudinally spaced in the well string and having bores of different diameter, a sleeve closed at its upper end and adapted for sealed sliding fit in the liner of larger diameter, a tube depending from the sleeve, the upper end of the tube being open to the bore of the well string above the sleeve, the lower end of the tube being adapted for sealed sliding fit in the liner of smaller diameter, a pump barrel suspended from the liner of smaller diameter and communicating at its lower end with a production zone of the well, a pump plunger suspended from the tube and adapted for sealed sliding fit in the pump barrel, the pump plunger having a bore communicating with the tube, a check valve in the bore of the pump plunger adapted to open responsive to pressure exerted upwardly via the bore of the pump plunger, a compression chamber for elastic fluid in the bore of the sleeve, said chamber having an extension thereof radially defined between the tube and the liner of larger diameter, the compression chamber being closed at its end by the liner of smaller diameter and the closed upper end of the sleeve, and a control at the earth's surface for alternately supplying production fluid to and discharging production fluid from the well string for alternately exerting and relieving pressure on a column of production fluid in the well string, whereby pressure of said column of fluid is exerted against the upper surface of the closed upper end of the sleeve for downwardly shifting the sleeve and its depending tube and the pump plunger so as to contract the compression chamber and compress elastic fluid therein, and upon relief of pressure of said column of fluid the compressed elastic fluid exerts pressure against the under surface of the closed upper end of the sleeve for upwardly shifting the sleeve and its depending tube and the pump plunger so as to expand the compression chamber.

2. In a well pump, a well string, a pair of liners longitudinally spaced in the well string and having bores of different diameter, a sleeve closed at its upper end and adapted for sealed sliding fit in the liner of larger diameter, a tube depending from the sleeve, the upper end of the tube being open to the bore of the well string above the sleeve, the lower end of the tube being adapted for sealed sliding fit in the liner of smaller diameter, a pump barrel suspended from the liner of smaller diameter and communicating at its lower end with the bore of the well, a pump plunger suspended from the tube and adapted for sealed sliding fit in the pump barrel, the pump plunger having a bore communicating with the tube, a check valve in the bore of the pump plunger, a compression chamber for elastic fluid in the bore of the sleeve, said chamber having an extension thereof radially defined between the tube and the liner of larger diameter, the compression chamber being closed at its end by the liner of smaller diameter and the closed upper end of the sleeve, and a control at the earth's surface for alternately supplying fluid to and discharging fluid from the well string for alternately exerting and relieving pressure on a column of fluid in the well string, whereby pressure of said column of fluid is exerted against the upper surface of the closed upper end of the sleeve for downwardly shifting the sleeve and its depending tube and the pump plunger so as to contract the compression chamber and compress elastic fluid therein, and upon relief of pressure of said column of fluid the compressed elastic fluid exerts pressure against the under surface of the closed upper end of the sleeve for upwardly shifting the sleeve and its depending tube and the pump plunger so as to expand the compression chamber.

3. In a pump, a conduit, a liner in the conduit, a cooperating plunger, a compression chamber for elastic fluid defined and closed to the bore of the conduit by the cooperating liner and plunger, control means at one end of the conduit for alternately exerting and relieving fluid pressure in the conduit, the cooperating plunger and liner being arranged whereby fluid pressure in the conduit shifts the plunger in direction away from the control end of the conduit for contracting the compression chamber and compressing elastic fluid therein, and upon relief of fluid pressure in the conduit the compressed elastic fluid shifts the plunger in the opposite direction, a pump barrel at the end of the conduit remote from the control means, and a plunger for the pump barrel mechanically connected to and reciprocating with the first mentioned plunger and having a pump-valve controlling communication between the pump barrel and the bore of the conduit.

4. In a pump, a conduit, a liner in the conduit, a cooperating plunger, a compression chamber for elastic fluid defined and normally closed to the bore of the conduit by the cooperating liner and plunger, control means at one end of the conduit for alternately exerting and relieving fluid pressure in the conduit, the cooperating plunger and liner being arranged whereby fluid pressure in the conduit shifts the plunger for contracting the compression chamber and compressing elastic fluid therein, and upon relief of fluid pressure in the conduit the compressed elastic fluid shifts the plunger in the opposite direction, a passageway providing communication between the bore of the conduit and the compression chamber at terminal shifting of the plunger, means permitting flow via the passageway in only one direction, a pump barrel at the end of the conduit remote from the control means, and a plunger for the pump barrel mechanically connected to and reciprocating with the first mentioned plunger and having a pump-valve controlling communication between the pump barrel and the bore of the conduit.

5. In a pump, a conduit, a liner in the conduit, a cooperating plunger, a compression chamber for elastic fluid defined and normally closed to the bore of the conduit by the cooperating liner and plunger, control means at one end of the conduit for alternately exerting and relieving fluid pressure in the conduit, the cooperating plunger and liner being arranged whereby fluid pressure in the conduit shifts the plunger for contracting the compression chamber and compressing elastic fluid therein, and upon relief of fluid pressure in the conduit the compressed elastic fluid shifts the plunger in the opposite direction, passageways respectively providing communication between the bore of the conduit and the compression chamber at terminal shifting of the plunger in opposite directions, means permitting flow via each passageway in only one direction, a pump barrel at the end of the conduit remote from the control means, and a plunger for the pump barrel mechanically connected to and reciprocating with the first mentioned plunger and having a pump-valve controlling communication between the pump barrel and the bore of the conduit.

6. In a pump, a conduit, a liner in the conduit, a cooperating plunger, a compression chamber for elastic fluid defined and closed to the bore of the conduit by the cooperating liner and plunger, control means at one end of the conduit for alternately exerting and relieving fluid pressure in the conduit, the cooperating plunger and liner being arranged whereby fluid pressure in the conduit shifts the plunger for contracting the compression chamber and compressing elastic fluid therein, and upon relief of fluid pressure in the conduit the compressed elastic fluid shifts the plunger in the opposite direction, an auxiliary chamber, means for precharging the auxiliary chamber with fluid under pressure, a valve controlling communication between the auxiliary chamber and the compression chamber and tending to open and close respectively responsive to pressure in the compression chamber and in the auxiliary chamber, a pump barrel at the end of the conduit remote from the control means, and a plunger for the pump barrel mechanically connected to and reciprocating with the first mentioned plunger and having a pump-valve controlling communication between the pump barrel and the bore of the conduit.

JESSE E. HALL.